United States Patent Office 3,519,531
Patented July 7, 1970

3,519,531
COATED POLYPROPYLENE FILM AND LAMINATES FORMED THEREFROM
Earl Gordon James, Clifton Forge, Va., and Robert N. Manning, Marshallton, Del., assignors to Hercules Incorporated, Wilmington, Del., a corporation of Delaware
No Drawing. Continuation-in-part of application Ser. No. 162,919, Dec. 28, 1961. This application Dec. 30, 1966, Ser. No. 605,973
Int. Cl. B32b 27/08
U.S. Cl. 161—254                    7 Claims

ABSTRACT OF THE DISCLOSURE

Copolymers of ethylene and unsaturated carboxylic acid esters and particularly vinyl acetate and ethyl acrylate form adherent heat-sealable coatings on oriented polypropylene film. The coated film can be used as such or heat-sealed to other film-forming materials, including polypropylene itself, to form laminates.

---

This application is a continuation-in-part of our application Ser. No. 162,919 filed Dec. 28, 1961, now abandoned.

The present invention relates to articles of manufacture comprising oriented stereoregular polypropylene film having an adherent coating of a copolymer of ethylene and an unsaturated ester and to laminates of the coated film with other film-forming materials.

Stereoregular polypropylene of predominantly crystalline structure is a relatively new synthetic polymer that is finding wide acceptance in the plastics art. One of the most promising uses for this new polymer is in the manufacture of oriented film, which in turn finds use in the packaging and related arts.

For many uses it is desirable to provide oriented film of stereoregular polypropylene with a coating of another organic thermoplastic polymer. For instance, it is sometimes desirable to provide the film with a coating of a thermoplastic material that will serve to increase the vapor and moisture barrier characteristics of the film or serve to protect the film against sunlight. In other cases, it is desirable to coat the oriented film with a polymer that will improve the slip characteristics of the film or alter its coefficient of friction. In still other cases it is desirable to coat the oriented film with another polymer which is more heat sensitive than polypropylene in order to render the film heat sealable at a relatively low temperature. However, the application of coatings to stereoregular polypropylene is a major problem because stereoregular polypropylene is not receptive to the majority of lacquers and similar materials which are normally used as coatings on other films such as films of regenerated cellulose. The major problem in the case of stereoregular polypropylene is that of adhesion; in fact, the majority of coatings adhere so poorly to this polymer that they can be removed almost effortlessly by peeling or scraping.

In order to make polypropylene film receptive to coatings, it has hitherto been found necessary to develop methods of pretreating the film to modify its surface properties. Such pretreatment methods have been numerous and varied and include, for instance, corona discharge, heat and flame treatment, chemical treatment with agents such as ozone, gaseous halogen, chromic acid, and mixtures of sodium dichromate and sulfuric acid, and treatments by electronic bombardment. These pretreatments, however, are cumbersome and/or expensive, and the problem of producing coated films of oriented stereoregular polypropylene without pretreatment has remained unsolved.

In accordance with the present invention, it has been found that oriented stereoregular polypropylene film, i.e., film which has been stretched or drawn in either or both planar directions to give uniaxial or biaxial molecular orientation can be coated with a composition comprising a copolymer of ethylene and an unsaturated carboxylic acid ester, and that the composition will adhere strongly to the polypropylene film without the necessity for treating the film in accordance with any one of the presently known pretreatments for rendering polypropylene surfaces receptive to inks and coatings. Accordingly, this invention is directed to articles of manufacture comprising an oriented film of stereoregular polypropylene having an adherent coating comprising a copolymer of ethylene and an unsaturated ester of a carboxylic acid, said ester containing one and only one unsaturated group and being copolymerizable with ethylene in the presence of initiators capable of generating free radicals, and to methods for producing said articles.

The invention further relates to the laminated articles that result from using the aforesaid copolymers of ethylene and the unsaturated carboxylic acid ester as an adhesive for laminating stereoregular polypropylene film to another film which can be oriented or not, as desired, and can be made from stereoregular polypropylene itself or from a different film forming thermoplastic material.

The copolymers of ethylene and the unsaturated carboxylic acid ester of this invention are essentially amorphous high molecular weight solid resins having a weight ratio of ethylene: unsaturated carboxylic acid ester of 40:60 to 90:10, and preferably 87:13 to 60:40 and a melt index, according to the ASTM procedure D–1238–57T, of 2 to 30 and preferably 2.5 to 27. Copolymers containing less than 40 weight percent ethylene are not generally satisfactory since they lead to rubbery, tacky, elastomeric products characterized by excessive softness; those containing higher than 90% ethylene more closely resemble polyethylene and hence possess little or no adhesion.

The unsaturated carboxylic acid esters which are copolymerized with ethylene in accordance with the present invention are esters of the formulae (1) $RCOOR^1$ where R is hydrogen or an alkyl, haloalkyl, cycloalkyl or alkoxy alkyl radical containing from 1 to 12 and preferably from 1 to 6 carbon atoms and $R^1$ is an alkenyl radical containing a terminal $CH_2=C<$ group and having from 2 to 12 and preferably from 2 to 6 carbon atoms, and (2) $R^2COOR^3$ where $R^2$ is an alkenyl radical containing a terminal $CH_2=C<$ group chosen so that $R_2COOH$ is an acrylic or substituted acrylic acid and $R^3$ is an alkyl, cycloalkyl, haloalkyl or alkoxy alkyl radical containing from 1 to 12 carbon atoms and preferably from 1 to 6 carbon atoms. Suitable alkyl radicals which R and $R^3$ can comprise are methyl, ethyl, propyl, isopropyl, butyl, isobutyl, tertiary butyl and straight or branched chain amyl, hexyl, heptyl, octyl, nonyl decyl, undecyl and dodecyl, chloro-, bromo-, fluoro or iodosubstituted straight or branched chain alkyl radicals of 1 to 12 carbon atoms, cyclohexyl, and methoxy-, ethoxy, propoxy-, butoxy-, and like substituted alkyl radicals. Suitable alkenyl radicals which $R^1$ can comprise are vinyl, allyl, isopropenyl, butenyl, pentenyl, hexenyl, heptenyl, octenyl, nonenyl, decenyl, undecenyl and dodecenyl radicals having a terminal $CH_2=C<$ group as well as substituted alkenyl radicals. Suitable radicals derived from acrylic and substituted acrylic acids which $R^2$ can comprise are from acrylic, chloroacrylic, bromoacrylic, methacrylic, ethacrylic, fumaric, maleic, crotonic and like acids.

Illustrative of typical unsaturated esters suitable for the purposes of this invention are vinyl formate, vinyl acetate, vinyl chloroacetate, vinyl propionate, vinyl isobutyrate, isopropenyl acetate, isopropenyl butyrate, hexenyl acetate, pentyl hexanoate, allyl octanoate, nonenyl pentanoate, decynyl acetate, vinyl decanoate, propenyl undecanoate, vinyl dodecanoate, dodecenyl propionate; esters of acids of the acrylic and substituted acrylic series, such as the esters of fumaric, maleic, acrylic, methacrylic, chloroacrylic, itaconic and crotonic acids with methyl alohol, ethyl alcohol, propyl alcohol, butyl alcohol and the like, and particularly the ethyl-, propyl-, pentyl-, 2-ethylhexyl-, and decyl-acrylates and methacrylates, methyl-α-chloroacrylate, methyl crotonate, methyl itaconate, and the like.

The copolymers of ethylene and the unsaturated carboxylic acid ester are prepared by copolymerizing a mixture of ethylene and the unsaturated carboxylic acid ester using free radical initiators as catalysts under conditions known to the art. Suitable methods are those disclosed in U.S. 2,200,429, U.S. 2,394,960, U.S. 2,395,381, and U.S. 2,703,794.

The articles of this invention can be prepared by coating one surface of an oriented film of stereoregular polypropylene with the ethylene-unsaturated carboxylic acid ester copolymer. The coating can be accomplished by a simple operation in which a solution or dispersion of the copolymer in a volatile vehicle is applied to the film by spraying, brushing, rolling, dipping, or similar technique. Thereafter, the vehicle is removed by evaporation leaving an adherent layer of the copolymer. The coating can also be applied by the so-called hot melt technique wherein the film is dipped into the melted coating, or a film can be cast from a solution of the copolymer and the cast film melted on the surface of the oriented stereoregular polypropylene. Other known coating techniques are also applicable. The thickness of the adherent layer of copolymer is not critical, but for optimum results should be from about 0.02 to about 3.0 mils.

Laminated articles can be prepared in accordance with the invention simply by using the ethylene-unsaturated carboxylic acid ester copolymer as an adhesive for laminating oriented stereoregular polypropylene film to another film. This can be accomplished by applying the adhesive as a coating to either the surface of the oriented stereoregular polypropylene film or the surface of the other film or to both the surface of the oriented stereoregular polypropylene film and the other film and then sealing; extruding the molten adhesive into the nip formed between a moving web of the oriented stereoregular polypropylene film and a moving web of the other film, each film being carried into the nip by a set of contrarotating nip rolls and then cooling immediately after the moment of contact; or by other methods known to the art.

Suitable materials which can be used as the other film in accordance with the present invention to produce laminated articles are thermoplastic film-forming polymers and include for example the hydrocarbon polymers such as polyethylene (both low and high density), poly(butene-1), mixtures of polyethylene and polypropylene, mixtures of polypropylene and polybutylene; poly(vinyl acetate); poly(vinyl chloride); poly(vinylidene chloride); vinyl chloride/vinyl acetate interpolymers; vinyl chloride/vinylidene chloride interpolymers; copolymers of vinylidene chloride with, for example, acrylonitrile, methacrylonitrile, the alkyl, aryl, alkaryl, aralkyl or cycloalkyl acrylates or methacrylates, the alkoxy alkyl acrylates or methacrylates, the haloalkyl acrylates or methacrylates, alkyl α-halo acrylates, methylisopropenyl ketone and methylvinyl ether; poly(vinyl propionate); poly(vinyl chloroacetate); polystyrene; poly(vinyl naphthalene); poly(ethyl vinyl ether); methyl, ethyl and butyl acrylate and methacrylate homopolymers; polyesters such as poly(ethylene terephthalate) and copolyesters of ethylene terephthalate and ethylene isophthalate; polyamides such as poly(hexamethylene adipamide), poly(hexamethylene sebacamide), polycaproamide, N-methoxymethyl poly(hexamethylene adipamide), polyacrylamide, polymethacrylamide and poly(N-vinyl succinimide); poly(vinyl acetals) such as poly(vinylbutyral); poly(vinyl fluoride); poly(vinylidene fluoride); vinyl fluoride/vinylidene fluoride interpolymers; poly(chlorotrifluoroethylene); poly(tetrafluoroethylene); interpolymers of tetrafluoroethylene with hexafluoropropylene; vinylfluoride/tetrafluoroethylene interpolymers; vinylidene fluoride/tetrafluoroethylene interpolymers; vinylidene fluoride/hexafluoroethylene interpolymers; poly(oxymethylene), poly(acrylonitrile); poly(vinylpyridine); polymers of allyl glycidyl ether; cellophane; cellulose esters such as cellulose acetate and cellulose nitrate; rubber hydrochloride, and the like and even stereoregular polypropylene itself.

The invention is illustrated by the following detailed examples in which parts and percentages are by weight unless otherwise specified.

In all of the examples the coated film was examined to determine the degree of adhesion of the coating and heat-sealing characteristics. Adhesion was evaluated by applying a strip of conventional transparent pressure-sensitive "cellophane" tape to the surface of the coated film with sufficient pressure to assure complete adhesion. The tape was then jerked from the surface and the adhesion gauged by observing what part, if any, of the coating was removed by the tape. In this test a rating of "good" was assigned if no coating was stripped and a rating of "poor" if any of the coating was stripped from the film.

In determining heat sealability, the coated film was heat sealed (coated side facing coated side) employing a Sentinel Heat Sealer, Model No. 12–12 ASC. The adhesion of the coating to the film was measured as the force in grams per inch necessary to pull this seal apart in a "T" peel (the two free ends pulled in opposite directions 90° to the plane of the seal) using a Scott Tester (Model L with Accr-o-meter Series 2 force measuring system) in which the rate of jaw separation was 12 inches per minute.

EXAMPLE 1

Oriented stereoregular polypropylene film 0.6 mil thick, formed by the extrusion of crystalline polypropylene having a birefringent melting point of 166° C. and a reduced specific viscosity of 3.2 (measured on a 0.1% solution of decahydronaphthalene at 135° C.) and then biaxially orienting by drawing, was surface treated by passing the film at 75 feet per minute over a grounded 6-inch diameter steam-heated roller covered with 10 wraps of 1-mil thick poly(ethylene terephthalate) film and through an electric discharge between an 8-inch knife edge electrode and the roller at a point 180° from the initial roll-film contact, the electrode-film (air) gap being 15 mils. The surface temperature of the film used to wrap the roller was 90.5° C. as measured by a portable thermocouple temperature-indicating device. Electrical power for the discharge was generated by an A. S. Mancib Company unit consisting essentially of a 3200 cycles-per-second alternator and a step-up transformer. The primary circuit was supplied with a current of 2.5 amps. at 240 volts and the voltage in the secondary or electrode circuit was about 10,000 volts. The effectiveness of the electrical discharge treatment was measured as a McLaughlin angle of 60° using the method and apparatus described by T. F. McLaughlin, Jr., SPE Journal 16, 710 (1960). A coating formulation comprising:

| | Parts by wt. |
|---|---|
| Ethylene-vinyl acetate copolymer [1] | 14.1 |
| Pentaerythritol tetrastearate | 0.9 |
| Toluene | 85.0 |

[1] The ethylene-vinyl acetate copolymer contained a weight ratio—ethylene : vinyl acetate of 71 : 29, had an inherent viscosity at 30° C. (0.25% by weight in toluene) of 0.85, and a melt index (ASTM D–1238–57T) of 15.

was heated to 60° C. to reduce the viscosity and then applied to the treated film using a hand rotogravure proofer having 55 lines per inch. The coated film was dried for 5 minutes at a distance of 8 inches below a bank of 250-watt infrared heaters to provide a temperature of 50 to 60° C. near the film surface. The coating weighed 0.06 pound per 100 sq. ft., which was equivalent to a coating 0.1 mil in thickness. After heat sealing for 0.25 second at 137.8° C. and 20 p.s.i. pressure, the coated film gave an average peel strength of 450 grams per inch. The coating before heat sealing was clear, showed no evidence of tackiness, and rated good in the adhesion test.

EXAMPLE 2

The oriented polypropylene film of Example 1, without prior surface treatment, was coated in the same manner as in Example 1 with the same copolymer in a coating formulation comprising:

| | Parts by wt. |
|---|---|
| Ethylene-vinyl acetate copolymer | 14.1 |
| Pentaerythritol tetrastearate | 0.75 |
| Oleyl amide | 0.15 |
| Toluene | 85.0 |

The coating formulation was preheated to 80° C. before application and the coated film was dried under infrared heaters for 10 minutes. After heat sealing as in Example 1, the coated film gave an average peel strength of 420 grams per inch. The coated film was not tacky, had a very slight haze, rated good in the adhesion test and had excellent slip properties (coefficient of friction under static load 0.150, coefficient of sliding friction—0.110 using a 200-g. sled at 6 inches per minute).

EXAMPLE 3

The procedure set forth in Example 2 was repeated using the copolymer of Example 1 in a coating formulation comprising:

| | Parts by wt. |
|---|---|
| Ethylene-vinyl acetate copolymer | 13.5 |
| Oxidized polyethylene wax (melting point 101–103° C.) | 0.75 |
| Pentaerythritol tetrastearate | 0.75 |
| Toluene | 85.00 |

The heat-sealed coated film had an average peel strength of 286 grams per inch. The coating was not tacky, had slightly better mar resistance than the coatings in Examples 1 and 2, and had a slight haze.

EXAMPLE 4

Example 2 was repeated using the copolymer of Example 1 in a coating formulation comprising:

| | Parts by wt. |
|---|---|
| Ethylene-vinyl acetate copolymer | 15.00 |
| Toluene | 85.00 |

This formulation, without modifiers, was only slightly tacky, gave a clear coating with excellent adhesion, and on heat sealing gave a peel strength of 114 grams per inch.

EXAMPLE 5

The oriented polypropylene film of Example 1, without prior surface treatment, was coated at room temperature with a formulation comprising:

| | Parts by wt. |
|---|---|
| Ethylene-vinyl acetate copolymer [1] | 14.1 |
| Pentaerythritol tetrastearate | 0.75 |
| Oleyl amide | 0.15 |
| Toluene | 85.0 |

[1] The copolymer contained a weight ratio of ethylene : vinyl acetate of 71 : 29, had an inherent viscosity at 30° C. (0.25% by weight in toluene) of .85 and a melt index (ASTM D-1238-57T) of 15.

The formulation was prepared by mixing the ingredients with mild agitation at 60° C. After cooling, the formulation, in gelled condition, was applied to the oriented film using a hand rotogravure proofer having 55 lines per inch. The coating was dried for 10 minutes at a distance of 8 inches below a bank of 250 watt infrared heaters. The heat-sealed coated film gave an average "T" peel of 322 grams per inch.

EXAMPLE 6

Example 5 was repeated using the same coating formulation reduced to 5% solids with toluene. The heat-sealed coating gave an average "T" peel strength of 147 grams per inch.

EXAMPLE 7

A hot melt film was prepared by fusing equal parts of the ethylene-vinyl acetate copolymer of Example 1 and the methyl ester of hydrogenated rosin, and casting the melt on a glass plate. Strips of the dried film (1 mil thick) were then placed between 2 sheets of the untreated biaxially oriented film of stereoregular polypropylene of Example 1 and the laminate heat sealed with the Sentinel sealer at 143.3° C. and 20 p.s.i. for 15 seconds. Adhesion was excellent, the laminate giving an average "T" peel strength of 1537 grams per inch.

EXAMPLE 8

A biaxially oriented stereoregular polypropylene film 0.5 mil thick formed by the extrusion and drawing of crystalline polypropylene having a melting point of 165° C. and a reduced specific viscosity of 3.1 (measured on a 0.1% solution of decahydronaphthalene at 135° C.) was coated with a formulation comprising 5 parts ethylene-ethyl acrylate copolymer having a weight ratio of ethylene:ethyl acrylate of 85:15, a density of about 0.95 at 30° C. and a melt index of 3.0 and 95 parts toluene. The coating was applied to the film at room temperature using a hand rotogravure proofer having 55 lines per inch. The coated film was dried for 5 minutes at a distance of 8 inches below a bank of 250-watt infrared heaters and heat sealed for 0.25 second at 143.3° C. and 20 p.s.i. pressure. The heat-sealed coated film gave an average "T" peel strength of 132 grams per inch. The coated film had good adhesion, was clear, did not block, and was abrasion resistant.

EXAMPLE 9

Example 8 was repeated using a coating formulation comprising 5 parts ethylene—ethyl acrylate copolmer having a weight ratio of ethylene:ethyl acrylate of 87:13, a melt index of 2.5 and a density of 0.928 at 23° C. and 95 parts toluene using a 150 line per inch hand rotogravure proofer. The coating had good adhesion, was clear, nontacky, and reasonably abrasion resistant, and after heat sealing gave a "T" peel strength of 132 grams per inch.

EXAMPLE 10

Oriented, stereoregular polyproplene film 0.5 mil thick, formed by the extrusion of isotactic polypropylene having a birefrigent melting point of 170° C. and a melt index of 3 (according to the method of ASTM D-1238-57T at 230° C.) followed by biaxial orientation by drawing, was surface treated as in Example 1, the effectiveness of the electrical discharge treatment being measured as a McLaughlin angle of 75°. The film was coated by means of a hand rotogravure roll having 150 lines per inch with an aqueous dispersion (12% solids) of a coating formulation comprising:

| | Parts by wt. |
|---|---|
| Ethylene-vinyl acetate copolymer [1] | 98.0 |
| Octyl phenol/ethylene oxide condensate (surface-active agent) | 2.0 |

[1] The ethylene-vinyl acetate copolymer contained a weight ratio ethylene : vinyl acetate of 67 : 33.

and the coated film dried for one minute at 120° C. The coat thickness was 0.04 mil. Heat sealing was carried out for 2 seconds under the temperature and pressure conditions specified below.

The seal strengths were as follows:

SEAL STRENGTHS

|  | Coated side to Coated side | | Coated side to Uncoated side | |
| --- | --- | --- | --- | --- |
| Seal Conditions | 130° C./5 p.s.i. | 110° C./10 p.s.i. | 130° C./5 p.s.i. | 110° C./10 p.s.i. |
| Seal strengths (grams/inch) | 75 | 75 | 25 | 25 |

EXAMPLE 11

The oriented polypropylene film of Example 10, without prior surface treatment, was coated in the same manner and with the same composition as in Example 4.

Heat sealing was carried out for two seconds at two different temperatures and pressures. The results are listed below:

SEAL STRENGTHS

|  | Coated side to coated side | | Coated side to Uncoated side | |
| --- | --- | --- | --- | --- |
| Seal conditions | 130° C./5 p.s.i. | 110° C./10 p.s.i. | 130° C./5 p.s.i. | 110° C./10 p.s.i. |
| Seal strengths (grams/inch) | 175 | 160 | 75 | 75 |

The coating before heat sealing was clear and showed excellent adhesion.

EXAMPLE 12

Oriented, stereoregular polypropylene film, 0.65 mil thick, formed by the extrusion of the isotactic polypropylene used in Example 10, followed by biaxial orientation by drawing, was subjected to the same surface pretreatment as in Example 10. The effectiveness of this surface pre-treatment was measured by its reducing the contact angle between water and the film to 75°.

This film was coated by extruding the molten coating composition downwardly on to the film immediately before the latter was fed into the vertical nip formed by a pair of rollers, one a rubber-covered roller and the other, around which the coated film was removed, a cooled metal roller, the copolymer coating being in contact with the latter.

The coating composition was made up as follows:

|  | Parts by wt. |
| --- | --- |
| Ethylene:vinyl acetate copolymer [1] | 46.6 |
| Pentaerythritol tetrastearate | 26.6 |
| Glycerol ester of hydrogenated rosin | 26.6 |

[1] The ethylene: vinyl acetate copolymer had a weight ratio of ethylene: vinyl acetate of 72:28, and a melt index (ASTM D-1238-57T) of 25.

The film was fed into the nip at a rate of 30 feet per minute and the molten coating composition was extruded at a temperature of 140° C. and a rate of about 1 lb. per minute, giving a coat thickness of one mil. The coating had good adhesion to the base film. When heat sealed at a temperature of 110° C., pressure 10 p.s.i., time 2 seconds, the following values for heat seal strength were obtained.

|  | Seal strengths (grams/inch) |
| --- | --- |
| Coated side to coated side | >600 |
| Coated side to uncoated side | >600 |

EXAMPLE 13

The oriented polypropylene film of Example 12 without pretreatment was coated as described in Example 12 with the same coating composition. A coat thickness of 1 mil was again obtained. The coating had excellent adhesion to the base film. When heat sealed at a temperature of 110° C., pressure 10 p.s.i., time 2 seconds, the following values of heat seal strengths were obtained:

|  | Seal strengths (grams/inch) |
| --- | --- |
| Coated side to coated side | >600 |
| Coated side to uncoated side | >600 |

EXAMPLE 14

The oriented polypropylene film of Example 12 without pretreatment was coated as described in Example 12 with the same coating composition but the rate at which the polypropylene film was fed was increased to 160 feet per minute, the rate of extrusion remaining at 1 lb. per minute, and the temperature of extrusion being 140° C.

A coat thickness of 0.5 mil was obtained. Adhesion to the polypropylene film was good and, when heat sealed at a temperature of 110° C., pressure 10 p.s.i., time 2 seconds, the following values for seal strength were obtained:

|  | Seal strength (grams/inch) |
| --- | --- |
| Coated side to coated side | >600 |
| Coated side to uncoated side | >600 |

EXAMPLES 15–17

Samples of 1 mil biaxially oriented film of the polypropylene of Example 1 and surface treated to give a McLaughlin angle of 55° were coated with aqueous dispersions (50% solids) of ethylene-vinyl acetate copolymers containing from 28 to 40% by weight vinyl acetate using a No. 6 Meyer rod, and the coating dried for 30 seconds at a distance of 3 inches below a bank of four 250-watt quartz heaters. The coated samples (coating thickness 0.10–0.12 mil) were then laminated to various substrates by heat sealing the coated side of the film to the surface of the substrate at 143° C. and 20 p.s.i. pressure, and the strengths of the laminate seal at the coating-substrate interface determined according to test method ASTM D1876–61T. Details of the copolymer and substrate of these examples and the seal strengths obtained are tabulated below:

| | Copolymer | | | | Peel Strength of Coating to Substrate (grams/inch) | | | | |
| --- | --- | --- | --- | --- | --- | --- | --- | --- | --- |
| | | Vinyl | | | Coated | Poly(ethyl- | Poly- | Cellophane | |
| | Ethylene | Acetate | Melt | Inherent | Polypro- | ene tereph- | propyl- | | |
| Ex. | (percent) | (percent) | Index | Viscosity | pylene [1] | thalate) [2] | ene [3] | K Type [4] | MS Type [1] |
| 15 | 60 | 40 | 55 | 0.70 | 270 | 210 | 70 | 296 | 14 [5] |
| 16 | 67 | 33 | 25 | 0.78 | 240 | | | 110 | |
| 17 | 72 | 28 | 6 | 0.94 | 295 | 128 | | 117 | 118 |

[1] Coated film heat-sealed to itself with coated side facing coated side.
[2] Biaxially oriented poly(ethylene terephthalate) film 0.6 mil thick.
[3] Uniaxially oriented 1.5 mil polypropylene film which was corona-treated.
[4] Commercial cellophane (250K–204F).
[5] Commercial cellophane (195 MS4).

The stereoregular polypropylene used in making the film which is treated according to the process of this invention is a predominantly crystalline, i.e., crystallizable, polymer that is sometimes referred to as isotactic or syndiotactic polypropylene.

The ethylene-unsaturated carboxylic acid ester copolymers that are used in the invention are amorphous high molecular weight solid resins having a weight ratio of ethylene:unsaturated carboxylic acid ester of 90:10 to 40:60, and a melt index according to the ASTM procedure D–1238–57T of 2 to 30. The copolymers may be used in any of the forms in which such copolymers are available. Variation in the softening points of the copolymers is immaterial except that it will affect somewhat the temperature at which optimum heat-sealing of the film is obtained.

The copolymers can be applied to the film in the form of solutions, dispersions, or emulsions in any volatile, inert vehicle which is a solvent or a nonsolvent, as the case may be. Solvents useful in the preparation of coating solutions are preferably low hydrogen bonded solvents such as toluene, xylene, and mixtures of these with aromatic or aliphatic hydrocarbons and/or chlorinated hydrocarbons. The copolymers may also be applied free of solvent as hot melt coating. Any convenient manipulative technique, such as brushing, rolling, spraying, or dipping, can be employed to coat the film.

The copolymer composition that is employed to coat the film or to form an adhesive layer between film surfaces may also contain other ingredients, including, by way of example, pigments, dyes, plasticizers, slip agents, antistatic agents, and the like, provided they do not detract from the property of sealability. Particularly suitable are the various materials known to impart slip properties to the coatings, such as waxes, synthetic and natural, included among which are carnauba wax, oxidized polyethylene waxes, synthetic esters of long chain fatty acids or alcohols, and fatty acid amides. Advantageously, various tackifier agents may be included. Particularly suitable are rosins and rosin-derived resins. Preferred tackifiers are the various glycol esters of rosins, such as the ethylene glycol, trimethylene glycol, tetraethylene, glyco, etc., esters of rosin acids or rosins such as, for example, wood rosin, gum rosin, hydrogenated forms thereof, polymerized forms thereof, heat-treated forms thereof, as well as the acids contained therein, such as the abietic acid, pimaric acid, sapinic acid, dihydroabietic acid, tetrahydroabietic acid, etc. The glycol esters utilized will all have melting points in the range of about 25° C. to about 80° C., and preferably melting points in the range of from about 35° C. to about 70° C.

What we claim and desire to protect by Letters Patent is:

1. An article of manufacture comprising an oriented film of stereoregular polypropylene having thereon an adherent coating consisting essentially of a copolymer of ethylene and an unsaturated ester having a formula selected from the group consisting of $RCOOR^1$ and $R^2COOR^3$, wherein R is selected from the group consisting of hydrogen, alkyl, haloalkyl, cycloalkyl, and alkoxyalkyl radicals, $R^1$ is an alkenyl radical containing a terminal $CH_2\!=\!C\!<$ group, $R^2$ is an alkenyl radical containing a terminal $CH_2\!=\!C\!<$ group chosen so that $R^2COOH$ is an acrylic or substituted acrylic acid, and $R^3$ is selected from the group consisting of alkyl, cycloalkyl, haloalkyl, and alkoxyalkyl radicals.

2. The article of claim 1 in which the copolymer is a copolymer of ethylene and vinyl acetate having a weight ratio of ethylene:vinyl acetate of 40:60 to 90:10.

3. The article of claim 1 in which the copolymer is a copolymer of ethylene and ethyl acrylate having a weight ratio of ethylene:ethyl acrylate of 40:60 to 90:10.

4. The article of claim 1 wherein the article is a laminate composed of firmly adherent layers of the coated oriented film of stereoregular polypropylene and another film, said coating serving as an adhesive therebetween.

5. The article of claim 4 wherein the other film is stereoregular polypropylene.

6. A method of coating an oriented film of a stereoregular polypropylene which comprises applying to said film a coating consisting essentially of a copolymer of ethylene and an unsaturated ester having a formula selected from the group consisting of $RCOOR^1$ and $R^2COOR^3$, wherein R is selected from the group consisting of hydrogen, alkyl, haloalkyl, cycloalkyl, and alkoxyalkyl radicals, $R^1$ is an alkenyl radical containing a terminal $CH_2\!=\!C\!<$ group, $R^2$ is an alkenyl radical containing a terminal $CH_2\!=\!C\!<$ group chosen so that $R^2COOH$ is an acrylic or substituted acrylic acid, and $R^3$ is selected from the group consisting of alkyl, haloalkyl, cycloalkyl, and alkoxyalkyl radicals.

7. A method for adhering the surface of an oriented fim of stereoregular polypropylene to the surface of a second film which comprises applying to at least one of said film surfaces an adhesive consisting essentially of a copolymer of ethylene and vinyl acetate, pressing the coated surface into contact with the other film surface, and then heat-sealing.

References Cited

UNITED STATES PATENTS

| 2,953,551 | 9/1960 | White. | |
|---|---|---|---|
| 3,232,789 | 2/1966 | Pelzek et al. | 161—254 |
| 3,232,895 | 2/1966 | Klein et al. | 161—247 |
| 3,260,776 | 7/1966 | Lindstrom et al. | 117—138.82 |
| 3,265,552 | 8/1966 | Berggren et al. | 161—402 |

ROBERT F. BURNETT, Primary Examiner

R. L. MAY, Assistant Examiner

U.S. Cl. X.R.

117—138.8, 161; 156—332; 161—402

PO-1050
(5/69)

UNITED STATES PATENT OFFICE
CERTIFICATE OF CORRECTION

Patent No. 3,519,531      Dated July 7, 1970

Inventor(s) Earl G. James and Robert N. Manning Case X-2

It is certified that error appears in the above-identified patent and that said Letters Patent are hereby corrected as shown below:

Column 8, in the last column of the Table, "MS Type $_1$" should read -- MS Type$^5$ --, and "14$^5$" should read -- 141 --.

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents